United States Patent
Banks et al.

(10) Patent No.: US 9,609,082 B2
(45) Date of Patent: *Mar. 28, 2017

(54) PROCESSING A UNIT OF WORK

(71) Applicant: International Business Machines Corporation, Armonk, NY (US)

(72) Inventors: Andrew D. J. Banks, Romsey (GB); Gavin D. Beardall, Alresford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,975

(22) Filed: Jun. 28, 2015

(65) Prior Publication Data

US 2015/0304451 A1 Oct. 22, 2015

Related U.S. Application Data

(63) Continuation of application No. 13/434,576, filed on Mar. 29, 2012, now Pat. No. 9,104,503, which is a (Continued)

(30) Foreign Application Priority Data

Jun. 29, 2010 (EP) .................................... 10167601

(51) Int. Cl.
*G06F 15/16* (2006.01)
*H04L 29/08* (2006.01)
(Continued)

(52) U.S. Cl.
CPC ................ *H04L 67/32* (2013.01); *G06F 9/54* (2013.01); *H04L 67/42* (2013.01)

(58) Field of Classification Search
CPC ............ G06F 9/54; H04L 67/32; H04L 67/42
See application file for complete search history.

(56) References Cited

U.S. PATENT DOCUMENTS 5,987,502 A * 11/1999 Banks ........................ G06F 9/52
709/203
6,009,455 A 12/1999 Doyle
(Continued)

OTHER PUBLICATIONS

United States Patent and Trademark Office, Notice of Abandonment for U.S. Appl. No. 13/154,377, Sep. 21, 2015, pp. 1-2, Alexandria, VA, USA.

(Continued)

*Primary Examiner* — John B Walsh
(74) *Attorney, Agent, or Firm* — Lee Law, PLLC; Christopher B. Lee

(57) ABSTRACT

A client computer group is created at a server computer by selecting a subset of a group of client computers, where each of the group of client computers has a separate communication channel with the server computer. A message from at least one of the subset of the group of client computers is received at the server computer. In response to receiving messages from at least two of the subset of the group of client computers within the client computer group, the messages are grouped under a single unit of work. A single decision associated with the single unit of work for the client computer group is computed. Each of the at least two of the subset of the group of client computers is operable to accept the single decision.

20 Claims, 3 Drawing Sheets

Related U.S. Application Data continuation of application No. 13/154,377, filed on Jun. 6, 2011, now abandoned.

(51) Int. Cl.
*G06F 9/54* (2006.01)
*H04L 29/06* (2006.01)

(56) References Cited

U.S. PATENT DOCUMENTS

| | | |
|---|---|---|
| 6,701,345 B1 | 3/2004 | Carley et al. |
| 7,293,145 B1 | 11/2007 | Baird et al. |
| 7,406,523 B1 | 7/2008 | Kruy et al. |
| 7,619,633 B2 | 11/2009 | Beda et al. |
| 7,912,858 B2 | 3/2011 | Fleck et al. |
| 8,713,060 B2 | 4/2014 | Sivasubramanian et al. |
| 8,726,278 B1 | 5/2014 | Shawver et al. |
| 9,104,503 B2 * | 8/2015 | Banks ................ G06F 9/54 |
| 2002/0019844 A1 | 2/2002 | Kurowski et al. |
| 2003/0097611 A1 | 5/2003 | Delaney et al. |
| 2003/0195938 A1 | 10/2003 | Howard et al. |
| 2004/0085947 A1 | 5/2004 | Ekberg et al. |
| 2004/0254984 A1 | 12/2004 | Dinker |
| 2004/0267747 A1 | 12/2004 | Choi et al. |
| 2006/0080389 A1 | 4/2006 | Powers et al. |
| 2006/0200829 A1 | 9/2006 | Astl et al. |
| 2006/0294333 A1 | 12/2006 | Michaylov et al. |
| 2007/0143765 A1 | 6/2007 | Aridor et al. |
| 2008/0005220 A1 | 1/2008 | Tsunakawa et al. |
| 2009/0222822 A1 | 9/2009 | Riemers |
| 2010/0198914 A1 | 8/2010 | Gehrke et al. |
| 2011/0093738 A1 | 4/2011 | Taylor et al. |

OTHER PUBLICATIONS

United States Patent and Trademark Office, Office Action for U.S. Appl. No. 13/154,377, Dec. 28, 2012, pp. 1-16, Alexandria, VA, USA.

United States Patent and Trademark Office, Office Action for U.S. Appl. No. 13/154,377, Jul. 18, 2013, pp. 1-17, Alexandria, VA, USA.

United States Patent and Trademark Office, Advisory Action for U.S. Appl. No. 13/154,377, Oct. 10, 2013, pp. 1-3, Alexandria, VA, USA.

United States Patent and Trademark Office, Office Action for U.S. Appl. No. 13/154,377, Aug. 20, 2014, pp. 1-29, Alexandria, VA, USA.

United States Patent and Trademark Office, Office Action for U.S. Appl. No. 13/154,377, Mar. 11, 2015, pp. 1-46, Alexandria, VA, USA.

United States Patent and Trademark Office, Office Action for U.S. Appl. No. 13/434,576, Jul. 31, 2014, pp. 1-22, Alexandria, VA, USA.

United States Patent and Trademark Office, Office Action for U.S. Appl. No. 13/434,576, Jan. 13, 2015, pp. 1-10, Alexandria, VA, USA.

United States Patent and Trademark Office, Notice of Allowance for U.S. Appl. No. 13/434,576, Mar. 30, 2015, pp. 1-9, Alexandria, VA, USA.

* cited by examiner

PROCESSING A UNIT OF WORK

BACKGROUND

The present invention relates to a method for processing a unit of work.

In some edge connectivity scenarios it is necessary to connect a large number, typically tens of thousands, of client computers. These client computers may need to perform updates to a server which are persistent, for example, reliably delivering messages to or from the server.

Typically, one thread per client waits for work from the client and when work is received, the server performs a disk force in a transaction specific to the client.

Disk forces are expensive in that they cause delay and this problem is compounded when disk forces occur for work from multiple client computers. The system software may try to merge several disk forces together to mitigate this, at a cost of having to manage the merging of disk forces.

Further, this mechanism requires many threads to be active.

Both problems inhibit scalability, especially in the case where there are many (e.g., tens of thousands) client computers

BRIEF SUMMARY

A method for processing a unit of work includes creating, at a server computer, a client computer group by selecting a subset of a plurality of client computers, where each of the plurality of client computers has a separate communication channel with the server computer; receiving a message from at least one of the subset of the plurality of client computers at the server computer; in response to receiving messages from at least two of the subset of the plurality of client computers within the client computer group, grouping the messages under a single unit of work; and computing a single decision associated with the single unit of work for the client computer group, where each of the at least two of the subset of the plurality of client computers is operable to accept the single decision.

An apparatus for processing a unit of work includes a network interface and a processor programmed to create a client computer group by selecting a subset of a plurality of client computers, where each of the plurality of client computers has a separate communication channel with the apparatus via the network interface; receive a message from at least one of the subset of the plurality of client computers at the apparatus via the network interface; responsive to receiving messages from at least two of the subset of the plurality of client computers within the client computer group, group the messages under a single unit of work; and compute a single decision associated with the single unit of work for the client computer group, where each of the at least two of the subset of the plurality of client computers is operable to accept the single decision.

A computer program product includes a computer readable storage medium including computer readable program code, where the computer readable program code when executed on a computer causes the computer to create a client computer group by selecting a subset of a plurality of client computers, where each of the plurality of client computers has a separate communication channel with the computer; receive a message from at least one of the subset of the plurality of client computers at the computer; in response to receiving messages from at least two of the subset of the plurality of client computers within the client computer group, group the messages under a single unit of work; and compute a single decision associated with the single unit of work for the client computer group, where each of the at least two of the subset of the plurality of client computers is operable to accept the single decision.

BRIEF DESCRIPTION OF THE SEVERAL VIEWS OF THE DRAWINGS

The present subject matter will now be described, by way of example only, with reference to preferred embodiments thereof, as illustrated in the following drawings.

DETAILED DESCRIPTION

Figure 1:
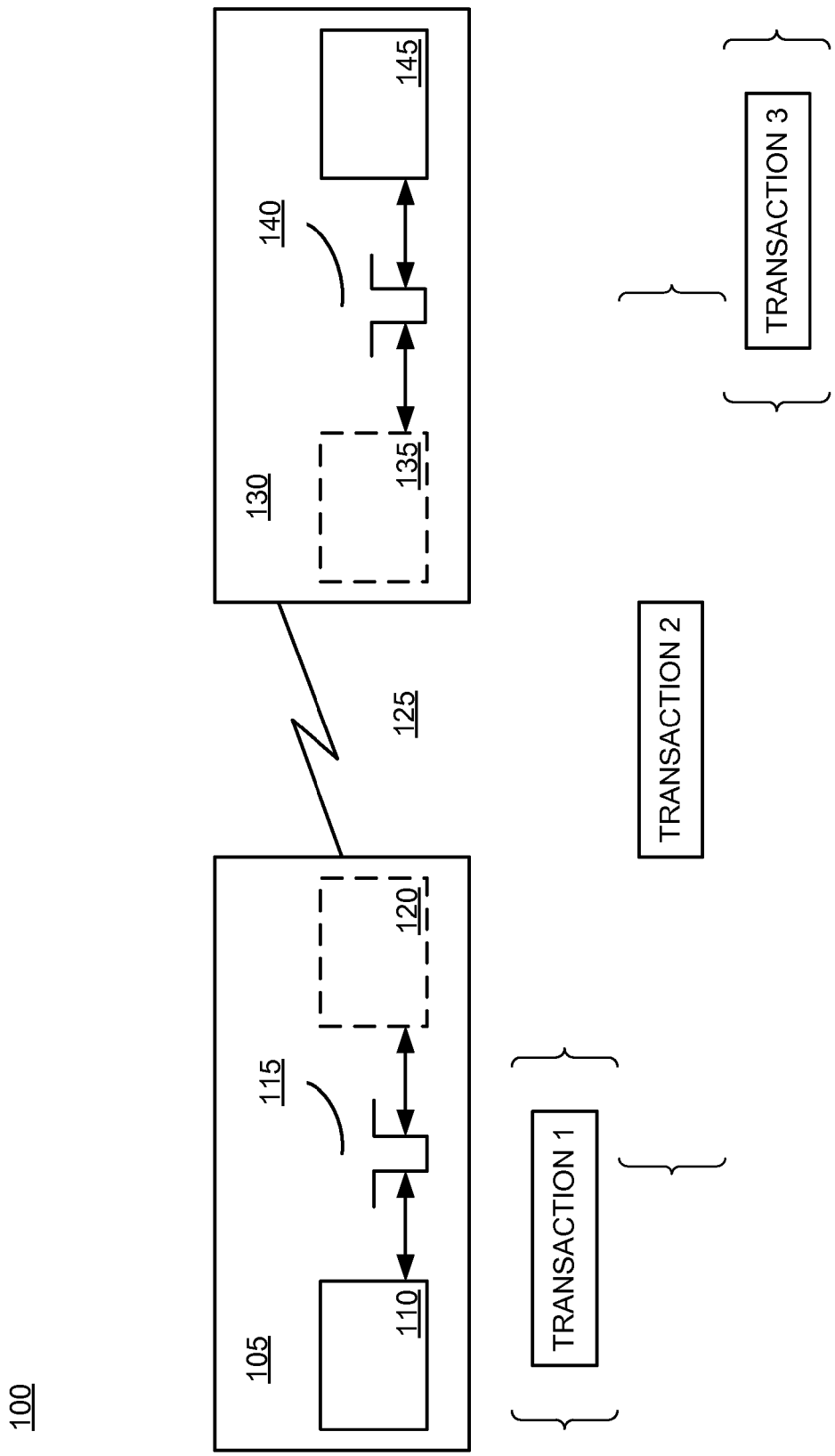
FIG. 1 is a block diagram of an example of an implementation of a system according to an embodiment of the present subject matter.

FIG. 1 is a block diagram of an example of an implementation of a system (100) in which the preferred embodiment may be implemented. There is shown a client computer (105) having a client application (110) including an associated queue (115) and a client middleware application (120) operable to manage the queue (115). In an example, the client computer (105) may include an electricity meter and the client application (110) is an application that produces messages including electricity readings.

It should be understood that, alternatively, the client application (110) may not have an internal queue. Rather, the production and consumption of messages associated with the client application (110) may be synchronous with a server application.

The client computer (105) is operable to communicate with a server computer (130) using a network (125). The server computer (130) executes a server application (145) including an associated queue (140) and a server middleware application (135) operable to manage the queue (140). In an example, the server application (145) may include an application that consumes messages including electricity readings and responsively produces messages including, for example, an instruction (e.g., "shut down") to an appliance associated with the electricity meter.

There are typically three transactions involved in transferring messages from one system to another. With reference to FIG. 1, "Transaction 1" is associated with the client application (110) storing a message on its associated queue (115) (e.g., where the queue (115) is local to the client application (110)). "Transaction 2" is associated with the transfer of the message from the client computer (105) to the server computer (130) using the network (125). It should be noted that Transaction 2 is not under the direct control of the client application (110) within the present example. "Transaction 3" is associated with receipt of the message at the server computer (130) in its associated queue (140) (e.g., where the queue (140) is local to the server computer (130)).

The preferred example is directed to processing associated with Transaction 2 as will be described herein.

Figure 2:
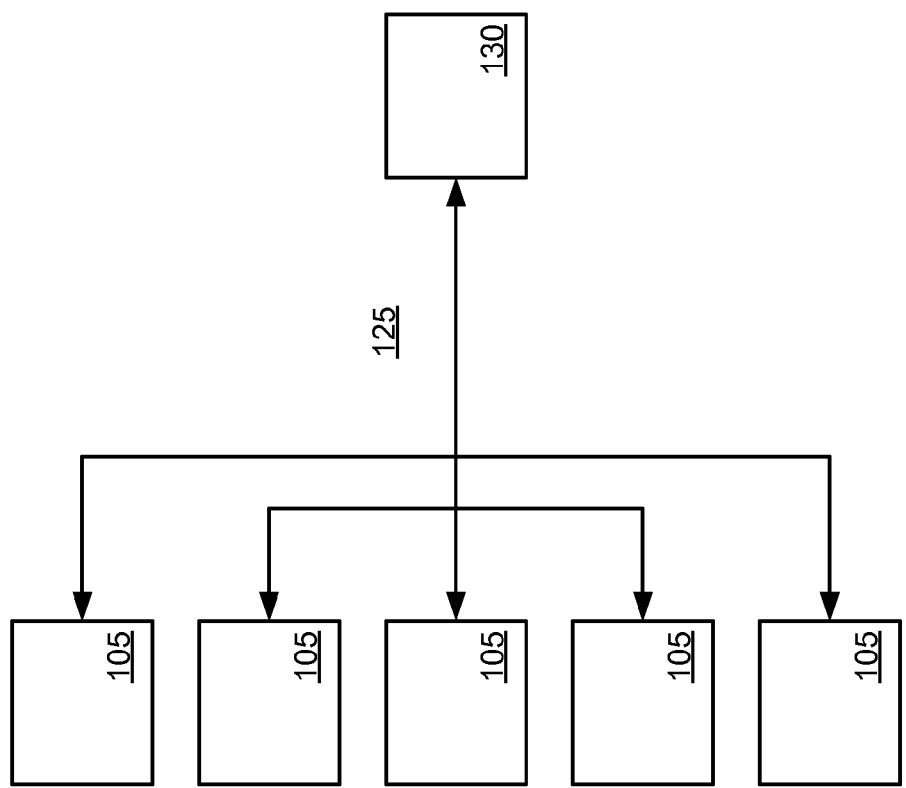
FIG. 2 is an additional block diagram of the system of FIG. 1 depicting several client computers having queues, operable to communicate with the server computer according to an embodiment of the present subject matter.

FIG. 2 is an additional block diagram of the system (100) of FIG. 1 depicting several client computers having queues, operable to communicate with the server computer (130).

With reference to FIG. 2, in use, there may be several (e.g., tens of thousands) of client computers (105) having queues, operable to communicate with the server computer (130).

Figure 3:
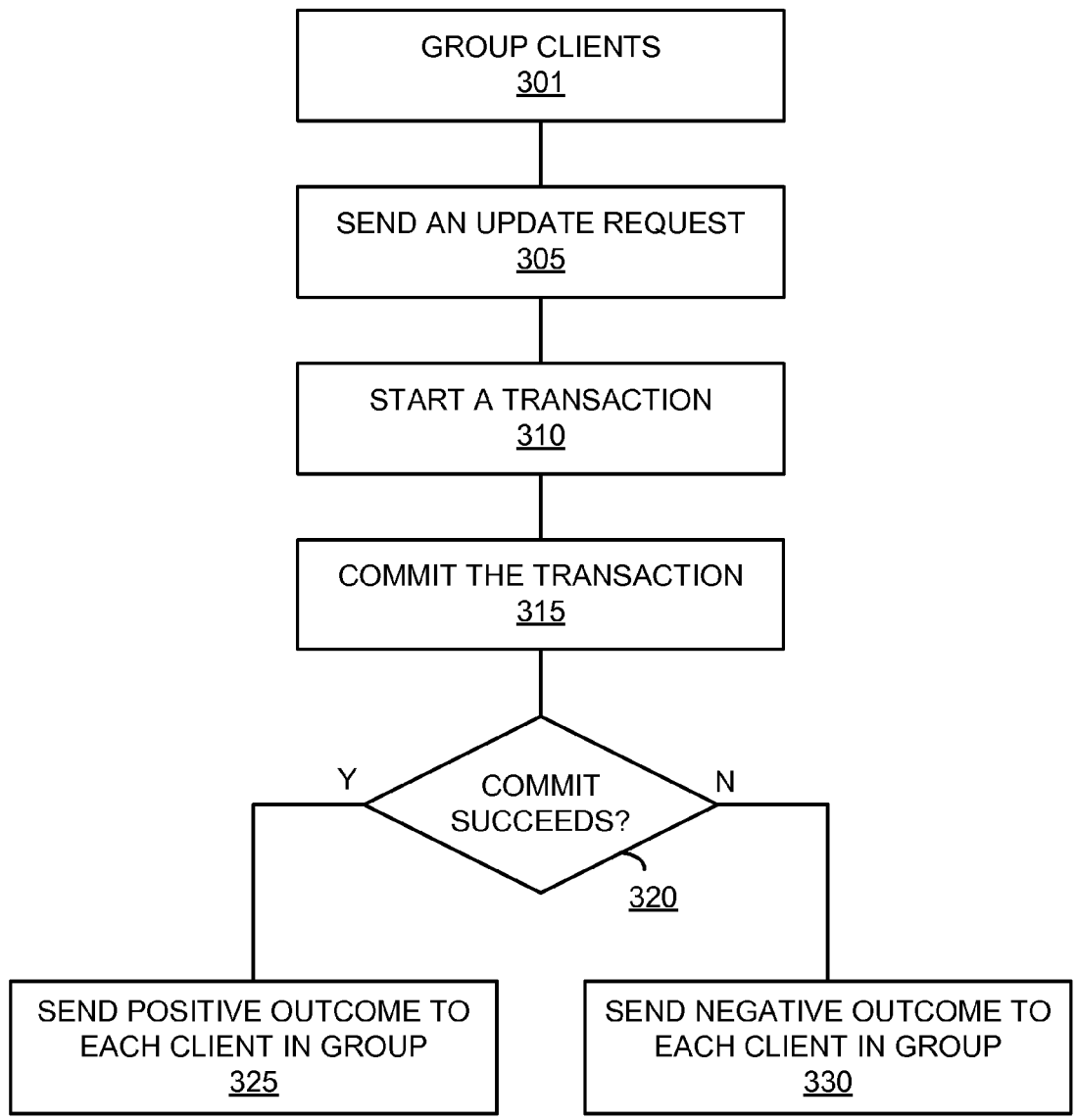
FIG. 3 is a flow chart an example of an implementation of a process operable at a server device to perform processing associated with several client computer devices according to an embodiment of the present subject matter.

FIG. 3 is a flow chart an example of an implementation of a process 300 operable at a server device, such as the server computer (130), to perform processing associated with several (e.g., tens of thousands) client computer devices, such as the client computers (105). With reference to FIG. 3, the transaction flows associated with a message inbound to the server computer (130) is shown.

In a pre-processing step, a number of client applications (110) may connect to the server middleware application (135), wherein each client application (110) has its own, separate communications channel and wherein each client application (110) sends a client identifier to the server middleware application (135).

At step 301, the server middleware application (135) creates a group of client applications by selecting a number of connected client applications (110).

The server middleware application (135) stores client identifiers and associated queue (115) identifiers of the selected client applications (110).

In one example, the group is created using any number of client applications (110). Preferably, a threshold value associated with a number of groups is selected and the number of connected client applications (110) is divided among the threshold value of the number of groups.

Preferably, a single thread associated with the server middleware application (135) is assigned to the group.

Each client application (110) in the group may produce one or more messages which are written to the associated queues (115).

Each client middleware application (120) takes a copy of the message from the queue (115). The message may be deleted from the queue (115) at this point or after acknowledgement of its receipt by the server computer (130), depending on the quality of service required for delivery of the message.

Next, the client middleware application (120) sends an update request (step 305) (that is, a request that makes a change to a resource manager), to each associated queue (115) of the client applications (110) that are in the group.

In response to the update request, messages that are present on each queue (115) are copied to an associated buffer, ready for sending across the network (125) to the server computer (130).

Each client middleware application (120) sends an associated message to the server computer (130) across the network (125).

The server computer (130) receives multiple messages from a number of different client applications (110). In response to receipt of the multiple messages, the server middleware (135) batches (step 310) the multiple requests under the single Transaction 2.

Any client application (110) that produces work shares a transaction with each of the other client applications in its group that have also performed some work. Each client application (110) in the group accepts a single outcome of the transaction.

The server middleware (135) writes each message to the queue (140) and a decision associated with the transaction is computed (step 315). In an example, the decision may be based on whether the write to the queue (140) succeeds.

In response to a decision being computed, if the decision is to commit the transaction (positive outcome to step 320), an acknowledgement identifying the commit decision is sent (step 325) to each client application (110) in the group.

If the decision is to rollback the transaction (negative outcome to step 320), an acknowledgement identifying the rollback decision is sent (step 330) to each client application (110) in the group. In an alternative implementation, if the decision is rollback, an acknowledgement identifying the rollback decision is sent (step 330) to the individual client whose message was not written to the queue (140). In another alternative implementation, the rollback decision may be indicated by terminating each client application's (or an individual client application's) (110) connection.

The transaction coordinator forces a write of the disk in order to log the decision. It should be noted that this may be computationally intensive. In contrast to conventional processing where this disk write had to occur on a per client basis causing enormous delay, the present subject matter associates the disk write with work undertaken by a group of client applications, thereby providing improved efficiency.

A symmetrical process is followed for transmission of messages from the server computer (130) to the client computer (105). Any combination of the delivery and confirmation flows for send and receipt of messages may be combined in a shared transaction in the server computer (130).

The decision of the transaction is executed on behalf of each client in the group.

The transaction associated with the group will fail if any one of the queues (115) in the group is not able to successfully participate in the transaction. Thus, although the present invention sacrifices some transaction isolation, for example by grouping client computers such that work from across a set of client applications is obtained and processed or assigning as a single thread to a group, the present subject matter achieves scalability in a scenario where there are several (e.g., tens of thousands of) client computers.

Advantageously, the transaction that is initiated is not under the influence of a client application (110). This prevents a client application (110) from choosing, at any time, to rollback the transaction which would cause failure of the transaction across all client applications (110). Thus, by implementing the grouping mechanism at the server middleware application (135) on the server computer (130), there is no danger of rollback due to client application involvement, which allows for a higher likelihood of each of the client applications being able to successfully commit.

Further, although transaction isolation is somewhat sacrificed, client computers may selected for a group that produce the same or similar messages to provide a higher likelihood of each of the client applications being able to successfully commit. Further, the client middleware application (120) or the server middleware application (135) may be able to carry out some pre-checking before commencement of the transaction in order to provide a higher likelihood of each of the client applications being able to successfully commit (e.g., by checking up front that each client application has an appropriate authorisation level required in order to participate in a transaction).

Although the group may be created arbitrarily, preferably the number of client computers is selected (e.g., using historical statistics) such that the number of client computers in a group is not too few (as this may cause inefficiency in that disk writes are forced for a small amount of work).

It may further be advantageous to create more than one group so that multi-processors may be exploited and so that processing activity does not decrease significantly or come to a halt while a disk write takes place.

If new client computers (105) connect to the server computer (130), the associated client applications (110) may be added to one or more groups (e.g., existing groups or newly created groups). Groups may also be re-balanced by moving client applications (110) from one group to another.

In scenarios where a few, heavyweight client devices connect to a server device, a single thread per client computer waits for work from the client application and a disk force is undertaken (per client computer)—in this scenario, the client computer is typically busy due to the relatively large amount of processing capacity and system resources it has. The present subject matter, on the other hand, is particularly suited to a scenario where several lightweight client devices, which are less busy (and have a relatively small amount of processing capacity), connect to a server device. Although each lightweight client device is relatively less busy, due to the grouping of several lightweight client devices, there is typically enough work to process without much wait time. The present subject matter is particularly suited to scenarios where there is a need for scalability and efficiency (e.g., where there is a large number of client devices but where the data produced by each client device is small and infrequent). Efficiency gains may be obtained therefore, by grouping such client devices resulting in the total work produced being of a significant amount. Examples of such scenarios are online multi-user interactive (e.g., gaming/gambling) systems and utility monitoring systems.

Memory may be allocated efficiently wherein a pool of buffers is made available for each group, and memory is allocated only to client applications (110) that have done some work.

It should be noted that, while the preceding description of the present subject matter describes certain actions as being performed by a server computer, these actions may alternatively be performed by a client computer.

The present subject matter allows for the aggregation of the disk forces and allows the use of a small number of threads when processing work from client applications. The transaction may use single phase or a two phase protocol. Preferably, in the case where the server computer receives a message from only one client computer in the subset (e.g., in accordance with a pre-configurable time threshold), processing is not held up waiting for a second message. Instead, default processing is reverted to (e.g., wherein the message from the one client computer is processed under a transaction that is associated only with the one client computer).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for processing a unit of work, comprising:
a network interface; and
a processor programmed to:
create a client computer batch message transaction group by selecting a subset of a plurality of client computers, where multiple messages from different client computers of the client computer batch message transaction group are committed as a batch messaging transaction to a single message reception queue and each of the plurality of client computers has a separate communication channel with the apparatus via the network interface;
in response to receiving separate messages from at least two of the subset of the plurality of client computers within the client computer batch message transaction group, group the separate messages under the batch messaging transaction as a single unit of work to commit to the single message reception queue; and
compute a single batch transaction commit decision based upon whether a write of each of the separate messages grouped within the single unit of work to the single message reception queue is successful, where each of the at least two of the subset of the plurality of client computers is operable to accept the single batch transaction commit decision.

2. The apparatus of claim 1, where the single unit of work is not under control of a client application associated with a client computer.

3. The apparatus of claim 1, where the processor is further programmed to assign, via a server application of the apparatus, a single thread to the single unit of work.

4. The apparatus of claim 1, where the processor is further programmed to send an acknowledgement identifying a batch transaction commitment to each client computer in the client computer batch message transaction group if the single batch transaction commit decision comprises a decision to commit the single unit of work comprising the grouped separate messages to the single message reception queue.

5. The apparatus of claim 1, where the processor is further programmed to send an acknowledgement identifying a batch transaction rollback to each client computer in the client computer batch message transaction group if the single batch transaction commit decision comprises a decision to rollback the single unit of work comprising the grouped separate messages.

6. The apparatus of claim 1, where the processor is further programmed to terminate each separate communication channel associated with each client computer in the client computer batch message transaction group if the single batch transaction commit decision comprises a decision to rollback the single unit of work comprising the grouped separate messages.

7. The apparatus of claim 1, where, in being programmed to create the client computer batch message transaction group by selecting the subset of the plurality of client computers, the processor is programmed to create the client computer batch message transaction group by selecting the subset of the plurality of client computers based upon a determination that each client application of each client computer in the subset of the plurality of client computers produces a same message or similar messages to each other client application.

8. The apparatus of claim 1, where the processor is further programmed to perform pre-processing checks on each client application of each client computer in the client computer batch message transaction group before commencement of the single unit of work comprising receiving a client identifier via a server middleware application from each client application of each client computer in the client computer batch message transaction group.

9. The apparatus of claim 1, where, in being programmed to create the client computer batch message transaction group by selecting the subset of the plurality of client computers, the processor is programmed to create the client computer batch message transaction group by selecting a number of client computers in the subset of the plurality of client computers according to historical statistics to provide efficiency within the client computer batch message transaction group relative to individual client message processing.

10. The apparatus of claim 1, where more than one client computer batch message transaction group is created.

11. A computer program product for processing a unit of work, comprising:
a computer readable storage medium having computer readable program code embodied therewith, where the computer readable storage medium is not a transitory signal per se and where the computer readable program code when executed on a computer causes the computer to:
create a client computer batch message transaction group by selecting a subset of a plurality of client computers, where multiple messages from different client computers of the client computer batch message transaction group are committed as a batch messaging transaction to a single message reception queue and each of the plurality of client computers has a separate communication channel with the computer;
in response to receiving separate messages from at least two of the subset of the plurality of client computers within the client computer batch message transaction group, group the separate messages under the batch messaging transaction as a single unit of work to commit to the single message reception queue; and
compute a single batch transaction commit decision based upon whether a write of each of the separate messages grouped within the single unit of work to the single message reception queue is successful, where each of the at least two of the subset of the plurality of client computers is operable to accept the single batch transaction commit decision.

12. The computer program product of claim 11, where the single unit of work is not under control of a client application associated with a client computer.

13. The computer program product of claim 11, where the computer readable program code when executed on the computer further causes the computer to assign, via a server application, a single thread to the single unit of work.

14. The computer program product of claim 11, where the computer readable program code when executed on the computer further causes the computer to send an acknowledgement identifying a batch transaction commitment to each client computer in the client computer batch message transaction group if the single batch transaction commit decision comprises a decision to commit the single unit of work comprising the grouped separate messages to the single message reception queue.

15. The computer program product of claim 11, where the computer readable program code when executed on the computer further causes the computer to send an acknowledgement identifying a batch transaction rollback to each client computer in the client computer batch message transaction group if the single batch transaction commit decision comprises a decision to rollback the single unit of work comprising the grouped separate messages.

16. The computer program product of claim 11, where the computer readable program code when executed on the computer further causes the computer to terminate each separate communication channel associated with each client computer in the client computer batch message transaction group if the single batch transaction commit decision comprises a decision to rollback the single unit of work comprising the grouped separate messages.

17. The computer program product of claim 11, where, in causing the computer to create the client computer batch message transaction group by selecting the subset of the plurality of client computers, the computer readable program code when executed on the computer causes the computer to create the client computer batch message transaction group by selecting the subset of the plurality of client computers based upon a determination that each client application of each client computer in the subset of the plurality of client computers produces a same message or similar messages to each other client application.

18. The computer program product of claim 11, where the computer readable program code when executed on the computer further causes the computer to perform pre-processing checks on each client application of each client computer in the client computer batch message transaction group before commencement of the single unit of work comprising receiving a client identifier via a server middleware application from each client application of each client computer in the client computer batch message transaction group.

19. The computer program product of claim 11, where, in causing the computer to create the client computer batch message transaction group by selecting the subset of the plurality of client computers, the computer readable program code when executed on the computer causes the computer to create the client computer batch message transaction group by selecting a number of client computers in the subset of the plurality of client computers according to historical statistics to provide efficiency within the client computer batch message transaction group relative to individual client message processing.

20. The computer program product of claim 11, where more than one client computer batch message transaction group is created.

* * * * *